United States Patent
McCausland

(10) Patent No.: US 9,071,796 B2
(45) Date of Patent: Jun. 30, 2015

(54) MANAGING MULTIPLE MEDIA CONTENT SOURCES

(75) Inventor: Doug McCausland, Arlington, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1933 days.

(21) Appl. No.: 11/694,441

(22) Filed: Mar. 30, 2007

(65) Prior Publication Data
US 2008/0244644 A1   Oct. 2, 2008

(51) Int. Cl.
*H04N 5/445* (2011.01)
*G11B 27/34* (2006.01)
*H04N 5/765* (2006.01)
*H04N 21/431* (2011.01)
*H04N 21/436* (2011.01)
*H04N 21/443* (2011.01)
*H04N 21/488* (2011.01)
*H04N 21/6587* (2011.01)
*H04N 21/84* (2011.01)
*H04N 5/77* (2006.01)
*H04N 5/781* (2006.01)
*H04N 5/85* (2006.01)
*H04N 5/907* (2006.01)
*H04N 9/804* (2006.01)

(52) U.S. Cl.
CPC ............ *H04N 5/44543* (2013.01); *G11B 27/34* (2013.01); *G11B 2220/2562* (2013.01); *H04N 5/44591* (2013.01); *H04N 5/765* (2013.01); *H04N 5/77* (2013.01); *H04N 5/772* (2013.01); *H04N 5/781* (2013.01); *H04N 5/85* (2013.01); *H04N 5/907* (2013.01); *H04N 9/8042* (2013.01); *H04N 21/4316* (2013.01); *H04N 21/43615* (2013.01); *H04N 21/4438* (2013.01); *H04N 21/4882* (2013.01); *H04N 21/6587* (2013.01); *H04N 21/84* (2013.01)

(58) Field of Classification Search
CPC .......... H04N 5/44543; H04N 21/4438; H04N 21/4316; H04N 21/84; H04N 21/4882; H04N 21/6587; H04N 5/765; H04N 21/43615; H04N 5/44591; H04N 5/772; H04N 9/8042; H04N 5/85; H04N 5/781; H04N 5/907; H04N 5/77; G11B 27/34; G11B 2220/2562
USPC ......................................... 715/201, 202, 205
See application file for complete search history.

(56) References Cited

U.S. PATENT DOCUMENTS

| | | | |
|---|---|---|---|
| 7,010,492 B1 * | 3/2006 | Bassett et al. | 705/14.1 |
| 7,133,062 B2 | 11/2006 | Castles et al. | |
| 2002/0053084 A1 * | 5/2002 | Escobar et al. | 725/47 |
| 2002/0069218 A1 * | 6/2002 | Sull et al. | 707/501.1 |
| 2002/0105534 A1 | 8/2002 | Balassanian | |
| 2003/0115607 A1 * | 6/2003 | Morioka et al. | 725/61 |
| 2003/0177503 A1 * | 9/2003 | Sull et al. | 725/112 |
| 2004/0264789 A1 * | 12/2004 | Akiyama et al. | 382/239 |
| 2005/0024485 A1 * | 2/2005 | Castles et al. | 348/14.03 |
| 2005/0193408 A1 * | 9/2005 | Sull et al. | 725/32 |

(Continued)

*Primary Examiner* — Nathan Hillery

(57) ABSTRACT

Media content is received through a plurality of inputs, each input being associated with one of a plurality of media content sources. Media content is provided to a media player for display in a first viewing frame based on a first one of the media content sources. A request is received for a second viewing frame. A list of available media content sources is provided. A source selection of a second one of the media content sources is received. Media content from the selected second one of the media content sources is provided in the second viewing frame.

23 Claims, 6 Drawing Sheets

(56) References Cited

U.S. PATENT DOCUMENTS

| | | |
|---|---|---|
| 2005/0235312 A1* | 10/2005 | Karaoguz et al. ............... 725/38 |
| 2006/0007933 A1* | 1/2006 | Maxson et al. ............... 370/392 |
| 2006/0020962 A1* | 1/2006 | Stark et al. ...................... 725/32 |
| 2006/0026636 A1* | 2/2006 | Stark et al. ...................... 725/37 |
| 2006/0031918 A1* | 2/2006 | Sarachik et al. ............... 725/138 |
| 2006/0171453 A1* | 8/2006 | Rohlfing et al. ......... 375/240.01 |
| 2006/0236342 A1* | 10/2006 | Kunkel et al. ................... 725/52 |
| 2007/0044133 A1* | 2/2007 | Hodecker ..................... 725/117 |
| 2007/0083616 A1 | 4/2007 | Madden |
| 2007/0087781 A1* | 4/2007 | Bettis et al. ................ 455/556.1 |
| 2007/0112837 A1* | 5/2007 | Houh et al. .................... 707/102 |
| 2007/0112939 A1* | 5/2007 | Wilson et al. ................. 709/219 |
| 2007/0118873 A1* | 5/2007 | Houh et al. .................... 725/136 |
| 2007/0294726 A1* | 12/2007 | Drazin ............................ 725/39 |
| 2008/0022310 A1* | 1/2008 | Poling et al. .................... 725/46 |
| 2008/0022322 A1* | 1/2008 | Grannan et al. ................. 725/78 |
| 2008/0155607 A1* | 6/2008 | Klappert ......................... 725/58 |
| 2008/0168523 A1* | 7/2008 | Ansari et al. .................. 725/131 |

\* cited by examiner

MANAGING MULTIPLE MEDIA CONTENT SOURCES

BACKGROUND INFORMATION

Users of media content, e.g., video, images, etc., typically access such content through a media player such as a television, projector, monitor, computer, etc. A media player may receive media content from a wide variety of media content sources. Devices that may provide media content sources include a video cassette (VHS) player, a digital video disc (DVD) player, a computer, a gaming console, a digital video recorder (DVR), a still or video camera, a memory card, etc. Media players may also receive media content from various media content providers, such as broadband, satellite, and cable companies that provide access to many media content sources, e.g. media channels, pay per view, video on demand, music, games, and networks such as the Internet, cable television network, etc. Individual media content sources may be provided to a media player or to a content processing device such as a set top box (STB) or the like that in turn provides media content to the media player.

Some content processing devices and/or media players may simultaneously accept inputs from multiple media content sources. A user may thereby view multiple media content sources in one media player, e.g., by switching or toggling between sources. Switching sources generally includes toggling between multiple sources or choosing one source from a list of available sources, whereby content of a particular source is exclusively displayed. Some television sets allow a consumer to view content from more than one video channel simultaneously, such as through a picture-in-picture feature. However, media content from sources associated with different devices generally may not be viewed in such a simultaneous fashion. Further, televisions etc. providing picture in picture features and the like generally provide limited or no information about the source or media content available through that source. In order to view or obtain information about media content being provided through a particular source, a user generally must access a view that exclusively displays the media content of the source.

DETAILED DESCRIPTION OF PREFERRED EMBODIMENTS

Figure 1:
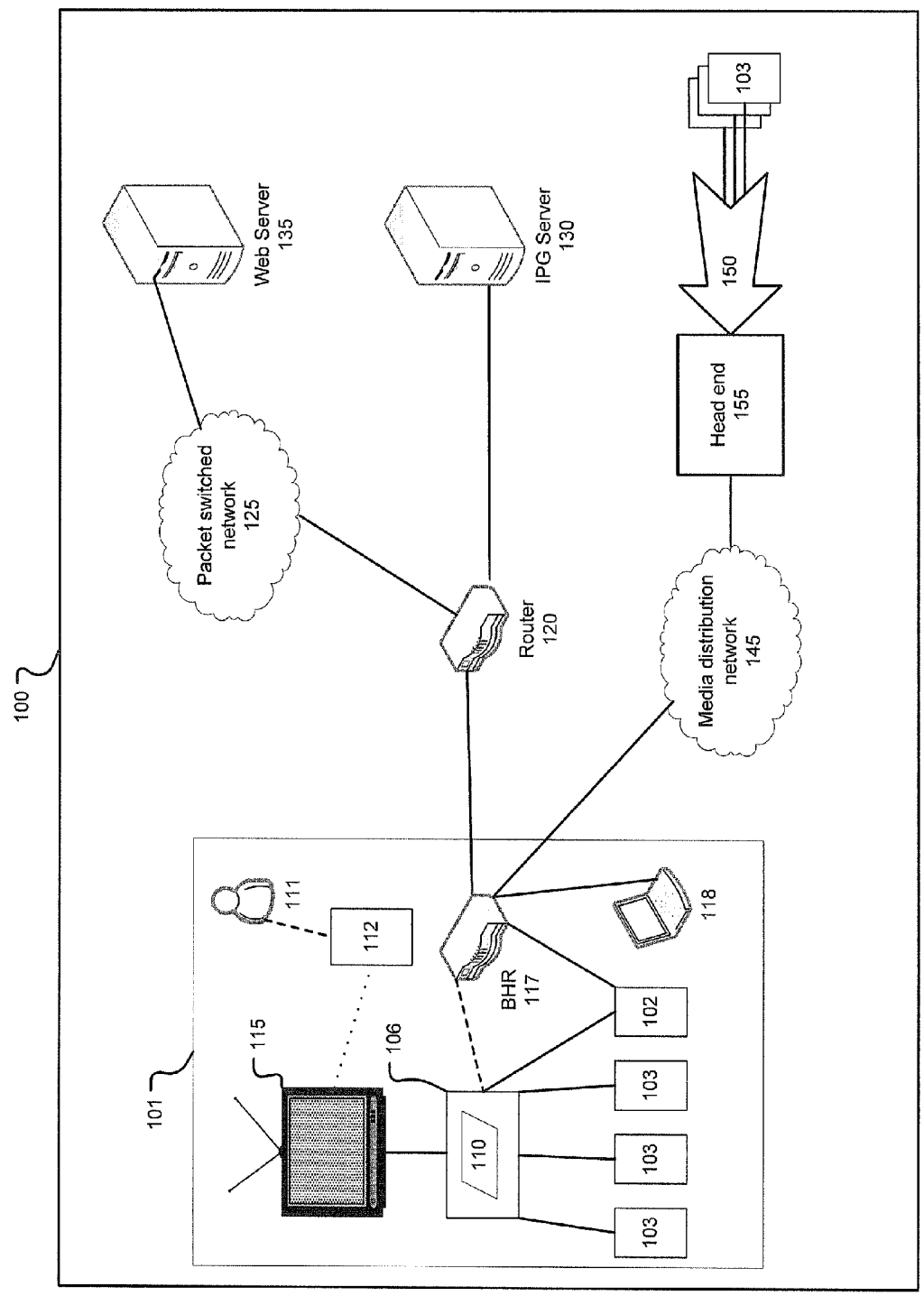
FIG. 1 illustrates an exemplary system for providing media content from multiple sources to a media player.

FIG. 1 illustrates an exemplary system 100 for providing media content from multiple media content sources 103 to a user 111 in a customer premises 101. Customer premises 101 generally includes a content processing device 102, one or more media content sources 103, a source aggregator 106, and a media player 115. Customer premises 101 may also include a broadband home router (BHR) 117 and a computer 118. BHR 117 generally communicates with a gateway router 120, and routes network traffic between customer premises 101 and various other networks and devices, including a packet switched network 125, an interactive program guide (IPG) server 130, a web server 135, and a media distribution network 145. As shown in FIG. 1, source aggregator 106 may also include an application 110 for managing multiple media content sources 103.

As shown in FIG. 1, content processing device 102 generally receives a media signal 150 from a head end 155 via network 145. Media signal 150 may be provided as an analog or as a digital signal, and may include multiple media content sources 103, e.g., multiple channels of video content. For example, media content sources 103 may provide various media channels, video on demand (VOD), pay per view (PPV), music channels, as well as other media content.

Content processing device 102 generally is a specialized device, e.g., a set top box (STB) or similar device, for receiving media signal 150 from head end 155 via network 145, and for providing multiple media content sources 103 to source aggregator 106. Content processing device 102 generally includes a processor and a memory, and may be provided with a proprietary or specialized operating system. For example, content processing device 102 may be an STB provided with a real time operating system (RTOS) such as is known. However, it is to be understood that content processing device 102 may be a computing device such as one of those enumerated below, so long as the computing device is capable of receiving media signal 150 from head end 155 via network 145, communicating with IPG server 130, etc.

Media content sources 103 may include, without limitation, signals from various media content devices including by way of example and not limitation: a digital video recorder (DVR); a personal video recorder (PVR); a digital video disc (DVD) player; a gaming console; a video cassette recorder (VCR); a digital camera (still or video); an analog video camera; a memory card reader (of various types and formats); a compact disc (CD)) player, etc. Further, media content sources 103 may include media streams from a computer 118 and a web server 135, e.g., in formats such as a standard promulgated by the Motion Picture Experts Group (MPEG), QuickTime, etc., and/or according to protocols such as Internet Protocol Television (IPTV), etc. Sources 103 may also include channels, e.g., video programming channels, included in signal 150 from head end 155 as is known. In addition sources 103 may include input through a computer/telephony interface to source aggregator 106, thereby allowing user 111 to access information related to telephone services, such as information concerning calls received including callers' telephone numbers, times of calls, etc., access to voicemail, configuration of services such as call forwarding, etc.

User 111 generally accesses media content through media player 115. Media player 115 may be a television receiver, such as is known, including a television or a high definition television (HDTV). Media player 115 may also be used to view a graphical user interface (GUI) provided by various devices, including content processing device 102 and source aggregator 106. For example, a television may be used to display a GUI to access various menus within an STB. Generally, media player 115 receives media content from source aggregator 106.

Source aggregator 106 generally includes a processor and a memory, and may be provided with a proprietary or specialized operating system. Source aggregator 106 may be a computing device, such as one of those enumerated below, so long as the device is capable of managing multiple media content sources 103. Further, it is possible that source aggregator 106 and content processing device 102 are a single device, e.g., a STB including special program instructions such as application 110. Using a STB as source aggregator 106 may be advantageous from the standpoint of utilizing existing hardware and avoiding the need for users to obtain additional hardware, or for installing additional hardware within a customer premises 101.

In any event, source aggregator 106 is generally a computing device with multiple inputs. Such inputs may be used, for example, by content processing device 102 and/or devices providing sources 103. Source aggregator 106 further generally includes one or more outputs for media player 115. For example, source aggregator 106 may include various types of inputs including, but not limited to: radio frequency (RF), composite video, separate video (S-Video), interlaced or progressive component video, broadband component video, FireWire (IEEE 1394), digital visual interface (DVI), high-definition multimedia interface (HDMI), network inputs (RJ-45, 802.11, etc.), as well as various other types of connections. Source aggregator 106 may also include one or more outputs using any of the above listed types of connections. Source aggregator 106 may also include the ability to digitally record media content. For example, source aggregator 106 may include a DVR that allows user 111 to record and play one or more types of media content from one or more available sources, including sources 103.

Application 110, included within source aggregator 106, manages multiple media content sources 103. Application 110 or similar program instructions within source aggregator 106 and/or content processing device 102 further generally provide a graphical user interface (GUI) to media payer 115. Application 110 generally thereby provides user 111 with the ability to manage and access multiple media content sources 103 through the GUI.

Generally, application 110 manages media content received in source aggregator 106 from sources 103, content processing device 102, computer 118, and/or web server 135. A source 103 may be streamed or broadcasted media content, such as through media signal 150 from head end 155, or a source may be accessed selectively by user 111, such as when user 111 selects a particular media channel through content processing device 102, or begins playing a DVD provided through a source 103, e.g., a DVD player, to source aggregator 106.

Application 110 generally allows user 111 to select particular sources 103 to source aggregator 106 to output to media player 115. For example, the GUI provided by application 110 may allow user 111 to create a viewing frame for each source of media content, and then manage multiple viewing frames. Generally, application 110 may allow user 111 to quickly and easily access multiple media content sources 103, while also providing user 111 with information about the source and/or media content. For example, user 111 may view one media channel (a first source), while having another media channel (a second source) available for quick access, thereby having access to two media content sources 103, both of which happen to be provided through content processing device 102 in this example.

The GUI provided by application 110 may also provide one or more header areas that may include metadata corresponding to each viewing frame, e.g., a header area may provide user 111 with information about the source 103 for the viewing frame, and/or about the media content accessible through the viewing frame. For example, metadata concerning a viewing frame may include the name of a source, the title of a program or web page, a parental rating, the score of a sporting event, or any other information available. Metadata may come from various sources including content processing device 102, sources 103, IPG server 130, or web server 135. For example, as is known, metadata may be included in an MPEG stream.

User 111 may utilize a control 112 to operate various electronic components and devices. For example, control 112 may be used to operate content processing device 102, sources 103, source aggregator 106, media player 115, computer 118, etc. Control 112 is generally a remote control that can selectively communicate with such devices through known wired or wireless communications including infrared (IR) and radio frequency (RF) communications. Control 112 may include numeric keys, arrow buttons, keys for specific functions, etc., and may also include alphanumeric keys. Control 112 may also be a wired or wireless keyboard as is known. Control 112 generally facilitates access to various functions and menus provided by or through the various electronic devices including content processing device 102, source aggregator 106, and media player 115.

Content processing device 102 and source aggregator 106 may selectively communicate with various devices via a broadband home router (B HR) 117, thereby allowing computer 118 and web server 135 to also provide media content to source aggregator 106. Generally, BHR 117 enables communication between various devices, including source aggregator 106, content processing device 102, computer 118, IPO server 130, and web server 135. BHR 117 may be one or more devices that are generally known for routing network traffic, and BHR 117 may communicate with other networks through a gateway router 120. BHR 117 may also provide a wired or wireless network within customer premises 101. BHR 117 may facilitate data transfer over one or more networks, including a packet switched network 125 and a media distribution network 145.

Media distribution network 145 is generally a network for providing media signal 150, such as is known. For example, network 145 may include hardware and/or software for providing a video signal via a coaxial cable and/or a fiber optic cable. As is known, media signal 150 is generally provided to a media distribution network 145 from a head end 155.

Computer 118 may be a computer workstation, a desktop, notebook, laptop, handheld computer, a personal digital assistant (PDA), a cellular phone, a smartphone, or some other computing device utilizing hardware and software to communicate with content processing device 102. BHR 117 may also selectively communicate with source aggregator 106, as shown by the dotted line in FIG. 1. In one embodiment, source aggregator 106 may include an input from BHR 117, such as a wired or wireless network connection. In another embodiment, as mentioned above, source aggregator 106 and content processing device 102 are one device that can communicate with various networks and devices via BHR 117.

Packet switched network 125 is generally an internet protocol (IP) network that utilizes known protocols found generally within the internet protocol suite. For example, network 125 uses protocols such as user datagram protocol (UDP), transmission control protocol (TCP), hypertext transfer protocol (HTTP), etc. Further, network 125 may include a variety of networks such as a wide area network (WAN), e.g., the internet, a local area network (LAN), etc. As is known, packet switched network 125 may be used to transport a variety of data, including multimedia data, such as audio and video. Accordingly, it is to be understood that embodiments are possible in which networks 125 and 145 are in fact combined into a single network, or in which media distribution network 145 is simply omitted, whereby packet switched network 125 is used to provide media signal 150 to content processing device 102.

IPG server 130 generally provides information related to available media content provided by media signal 150, and may also provide an interactive program guide to content processing device 102 and/or source aggregator 106. Media content information, or metadata, may include dates and times of television programs and movies, descriptions of particular content, channel information, parental guidelines, scores of sporting events, etc. IPG server 130 may also provide an interactive program guide to content processing device 102 for display on media player 115. As is known, an interactive program guide allows user 111 to obtain information and to select media content, generally by navigating and making selections using control 112. IPG server 130 generally includes a processor and a memory, as well as a computer readable medium such as a disk for storing data, e.g., interactive program guide data.

Computing devices, such as those mentioned above, may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system. Computing devices may include any one of a number of computing devices that are known, including, without limitation, a computer workstation, a desktop, notebook, laptop, handheld computer, or some other computing device. Devices such as computer 118 and web server 135 may provide various forms of media content including video, music, web pages, electronic documents, pictures, etc.

Computing devices, such as content processing device 102 and source aggregator 106, generally include instructions executable by one or more computing devices such as those listed above. Computer-executable instructions may be compiled or interpreted from computer programs created using a variety of programming languages and/or technologies known to those skilled in the art, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
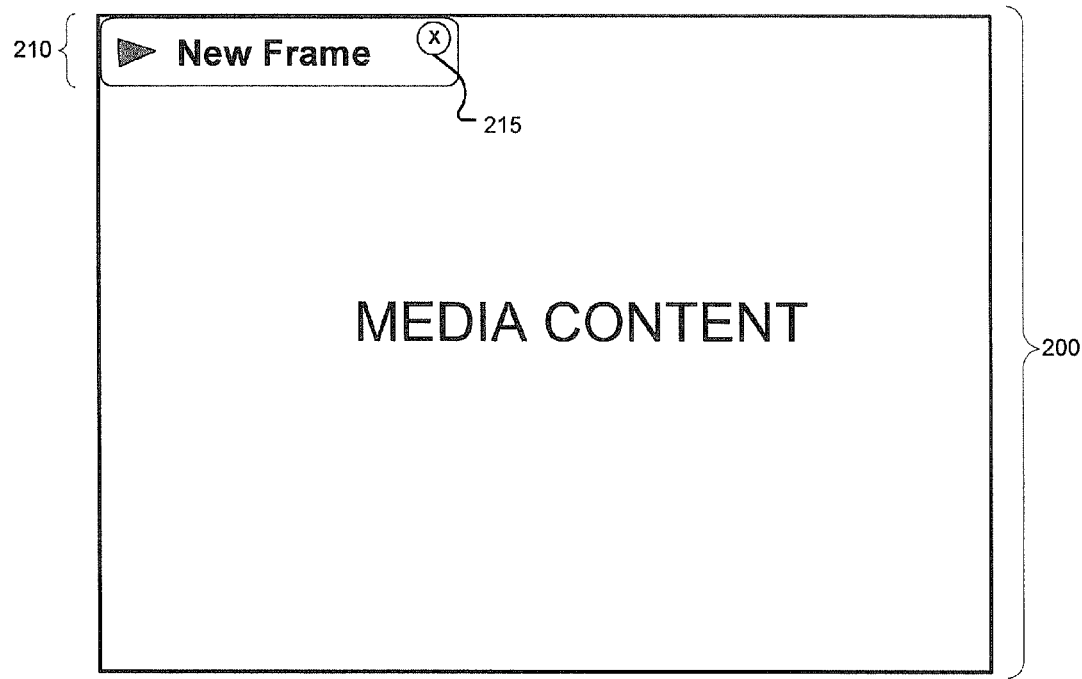
FIG. 2 illustrates an exemplary new frame selector that takes the form of a button or the like in a graphical user interface and that is overlaid on displayed media content.

FIGS. 2-5 illustrate various examples of a graphical user interface (GUI) for managing multiple media content sources 103. FIG. 2 illustrates a new frame selector 210 that takes the form of a button or the like in a GUI and that is overlaid on displayed media content 200. Generally, the GUI provided by application 110 is rendered as a graphical overlay on top of the displayed media content 200, in a known manner. Displayed media content 200 is generally provided by a source 103 and is displayed on media player 115. For example, displayed media content 200 may be video from a media channel provided by media signal 150, or video provided by a DVR, etc. User 111 may choose to create a new frame of displayed media content 200 by using control 112 to access a new frame selector 210, thereby providing input to application 110 to request the new frame. As described further below, upon selecting to create the new frame, user 111 can select a second source 103 to deliver media content to the new frame. A cancel button 215 allows user 111 to cancel, i.e., close, delete, or remove from the display of media player 115, a frame.

Figure 3:
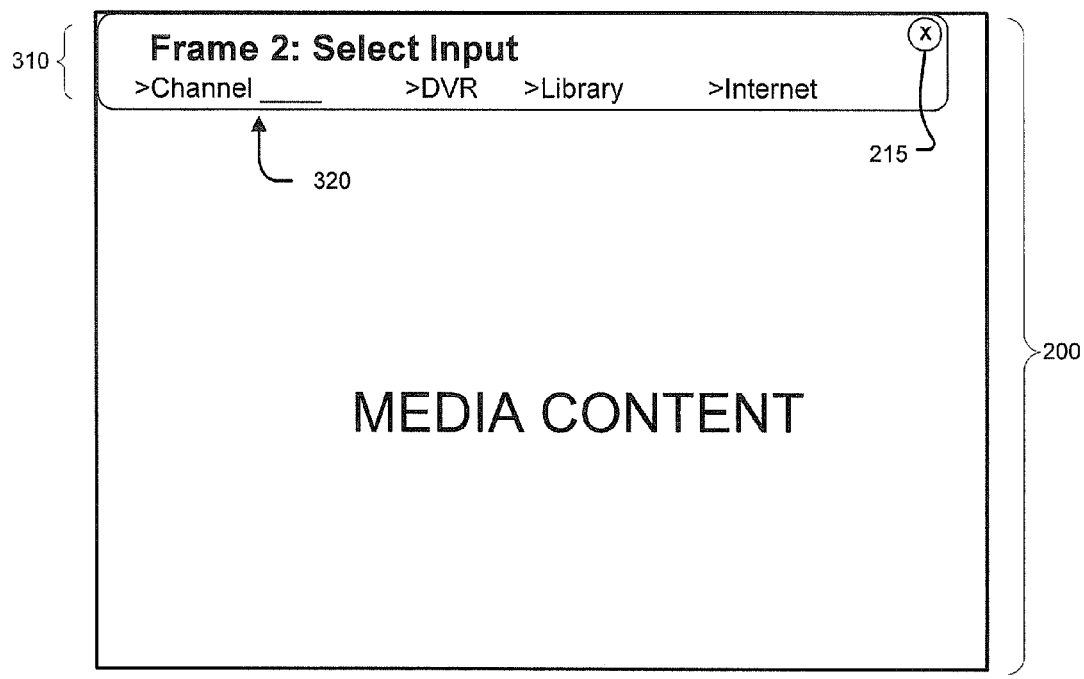
FIG. 3 illustrates an exemplary source select menu that may be accessed after a user chooses to create a new frame.

FIG. 3 illustrates a source select menu 310 that may be accessed after user 111 chooses to create a new frame using new frame selector 210. Source select menu 310, as illustrated in FIG. 3, provides a list of sources 103 that may be used to provide media content to a new frame. For example, source select menu 310 allows user 111 to select between a channel of media content 150, a DVR, a Library, and the Internet. Source select menu may also receive user input to select a particular source. For example, source select menu 310 may provide an input field 320 that allows user 111 to provide input, e.g., via control 112 when selecting a source 103. Input field 320 may allow user 111 to input a particular channel number to access a desired media channel, or input a universal resource locator (URL) to access a particular website or webpage on the Internet, such as by accessing web server 135.

Figure 4:
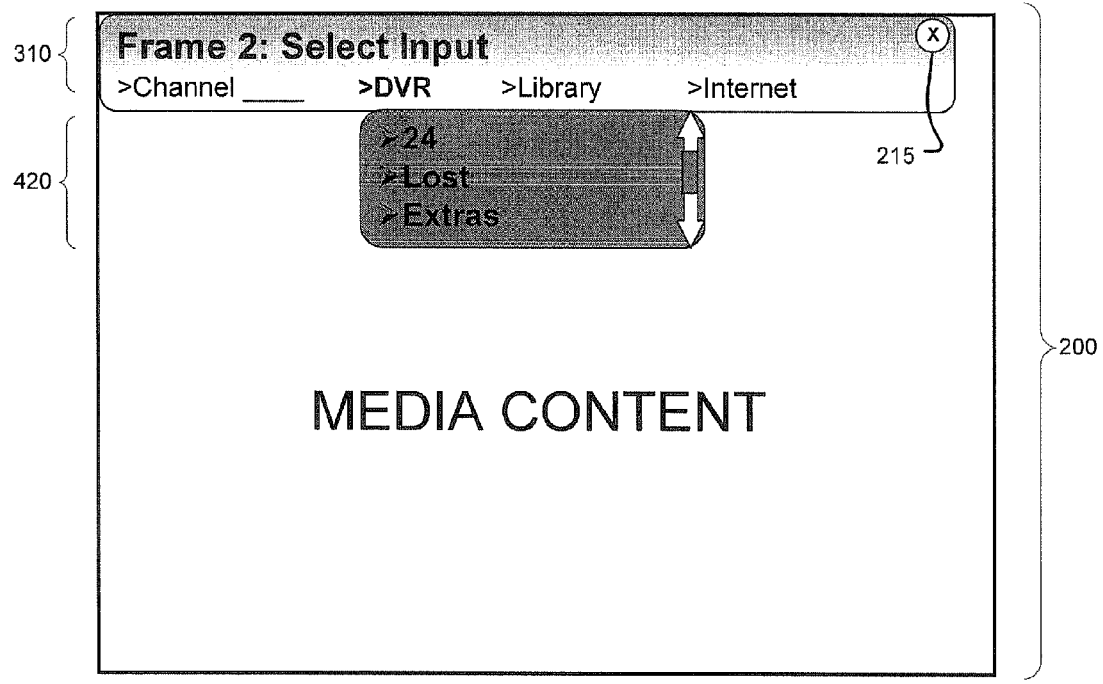
FIG. 4 illustrates an exemplary submenu listing available media content from a digital video recorder source.

FIG. 4 illustrates a sub-menu 420 showing available media content from a DVR source 103. Sub-menu 420 may include additional sub-menus as well. For example, as shown in FIG. 4, sub-menu 420 may include various recorded television programs. Another sub-menu 420 may include various episodes of a particular show that were recorded on different occasions. Sub-menu 420 may also provide access to content from a library. For example, a media library, e.g., stored on computer 118, IPG server 130, web server 135, etc., and accessible through content processing device 102, may include a collection of stored media content, such as music and movies, and user 111 may use a series of sub-menus 420 to access such stored media content. It is to be understood that the sub-menu 420 shown in FIG. 4 is exemplary and that other sub-menus 420 may be associated with a wide variety of sources 103. For example, for a source 103 including various channels of media content 150, a sub-menu 420 could list available channels.

FIG. 5 illustrates an example of multiple media content sources 103 available in multiple frames. In the example of FIG. 5, content processing device 102 provides two media content sources 103 by providing two media channels.

Accordingly, FIG. 5 includes a first header 510 associated with a first frame of media content 200, and a second header 520 associated with a second frame of media content 200. Each of headers 510 and 520 include metadata concerning their respective frames. In this example, the metadata within headers 510 and 520 include a channel number and a program name. Furthermore, header 520 includes dynamic metadata 525, showing the score of a sporting event in FIG. 5. Dynamic metadata 525 may come from sources 103, IPG server 130, web server 135, or dynamic metadata 525 may be read from a media stream, e.g., MPEG, a separate signaling channel in signal 150, etc. Additional frames may include media content from any source including content processing device 102, sources 103, web server 135, and even source aggregator 106. For example, in one embodiment source aggregator 106 includes a DVR, which may be a source 103 for recorded media content. In another embodiment, content processing device 102 and source aggregator 106 may be one device, where source aggregator 106 receives media signal 150 and provides access to a wide variety of sources 103, e.g., channels of media content, available from head end 155.

Figure 5A:
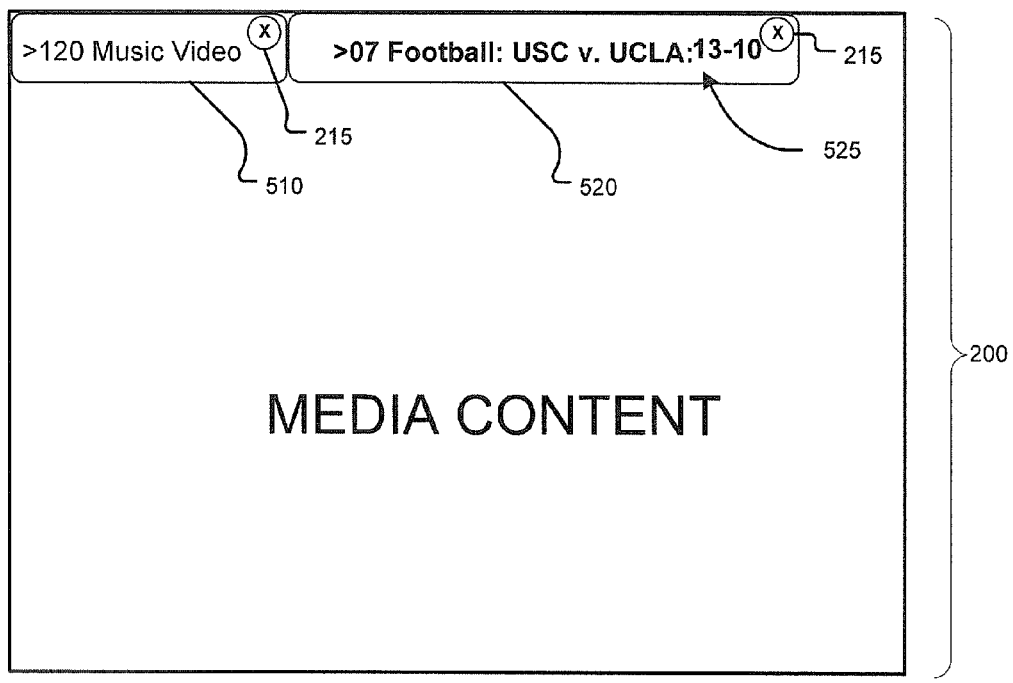
FIG. 5A illustrates an example of multiple media content sources available in multiple frames.

As shown in FIG. 5A, headers 510 and 520 may be persistent or temporary. That is, the graphical overlay providing headers 510 and 520 may be temporary, remaining visible for a short time and then disappearing, allowing user 111 an unobstructed view to media content 200. User 111 may use control 112 to activate the available frames, having them reappear with a push of a button. User 111 may use control 112 to manage the various frames by opening new frames, closing frames, configuring various options for each frame, selecting a media content source 103 for each frame, changing the size of a frame, and rearranging the order of frames.

Figure 5B:
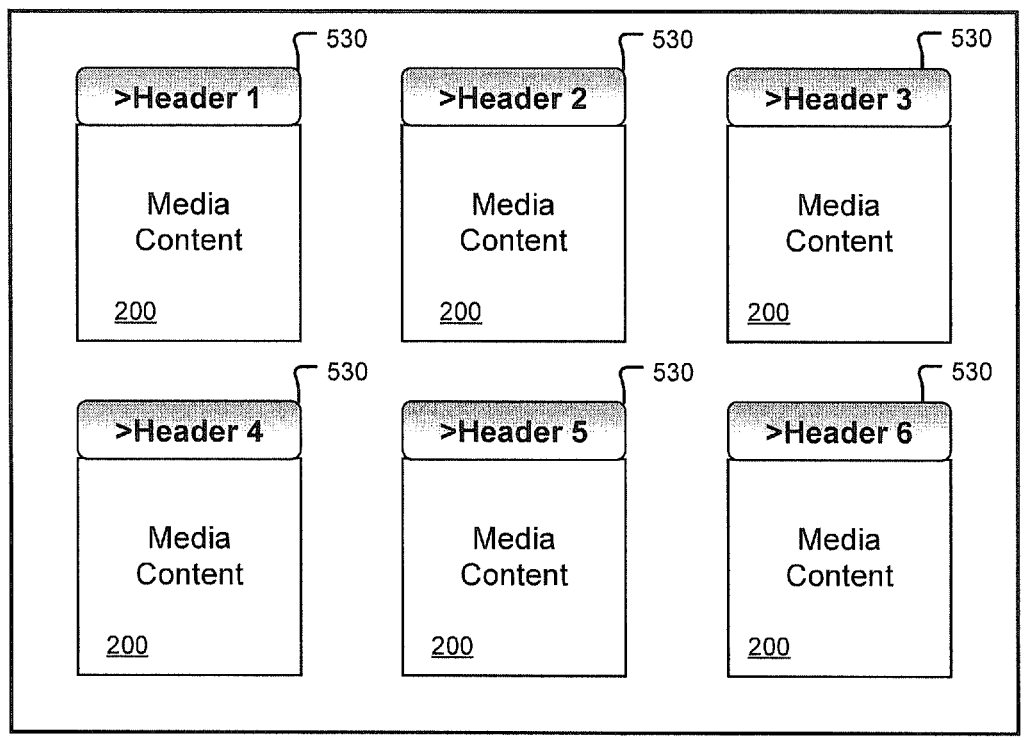
FIG. 5B illustrates another example of multiple media content sources available in multiple frames.

FIG. 5A illustrates one example of how application 110 may organize multiple media content sources 103 into multiple frames. As shown in FIG. 5A, each frame includes a header, and the active frame displays media content through media player 1115. User 111 may use control 112 to quickly switch frames and view the media content from the other source 103. Application 110 may also manage multiple frames in any number of alternative arrangements. For example, each frame may be viewed as an icon, a thumbnail, a vertical tab, a horizontal tab, rows and/or columns of headers, etc. Further, application 110 may only display or arrange headers such that user 111 may select a frame from the information available in a header. FIG. 5B illustrates another example of how application 110 may organize multiple media content sources 103 into multiple frames. As shown in FIG. 5B, six frames, each showing a thumbnail of media content beneath a header 530, are arranged for quick access. The media content displayed for each frame may be streaming video, or may be a static image. Static images may be updated periodically to reflect changing video content. Further, it is generally the case that where a frame includes channels of media content, user 111 may alter the media content included in the frame by changing the channel.

Figure 5C:
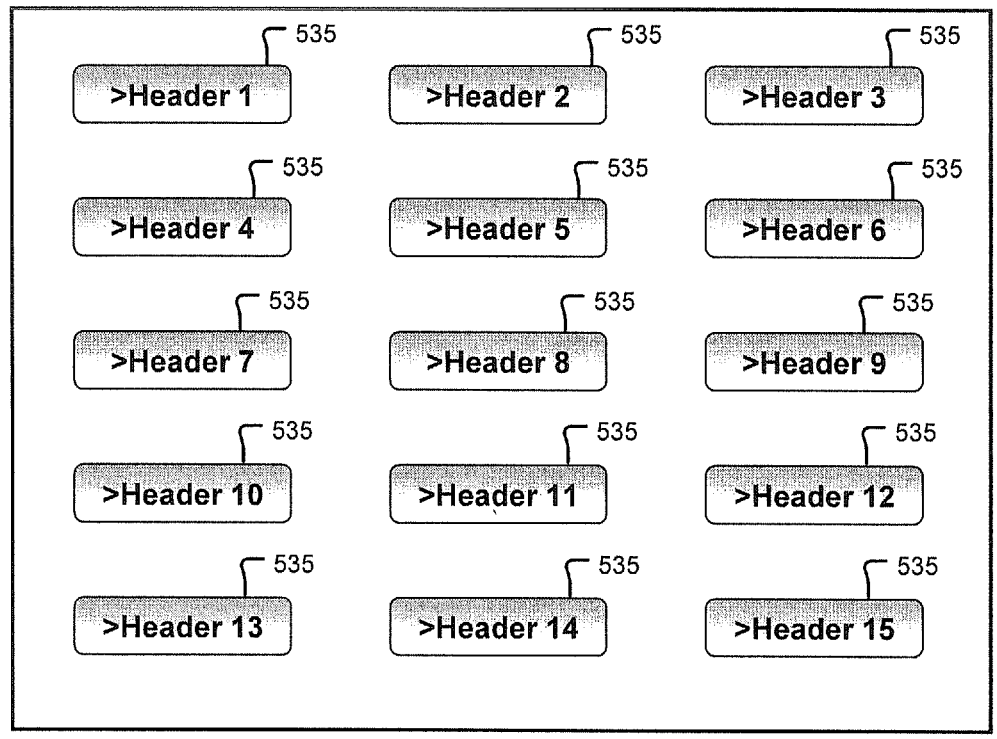
FIG. 5C illustrates yet another example of multiple media content sources available in multiple frames.

FIG. 5C illustrates another example of providing media content from sources 103 in which only header information for each viewing frame is displayed. As shown in FIG. 5C, such an arrangement of headers 535, where each header is associated with a media content source 103, may be quickly accessed by user 111 using control 112. Omitting media content for each viewing frame allows application 110 to display additional viewing frames for quick selection. Although cancel buttons 215 are not shown in FIGS. 5B and 5C, it is to be understood that that such buttons 215 may be, and likely are, included in or adjacent to the illustrated headers 530 and 535.

Figure 6:
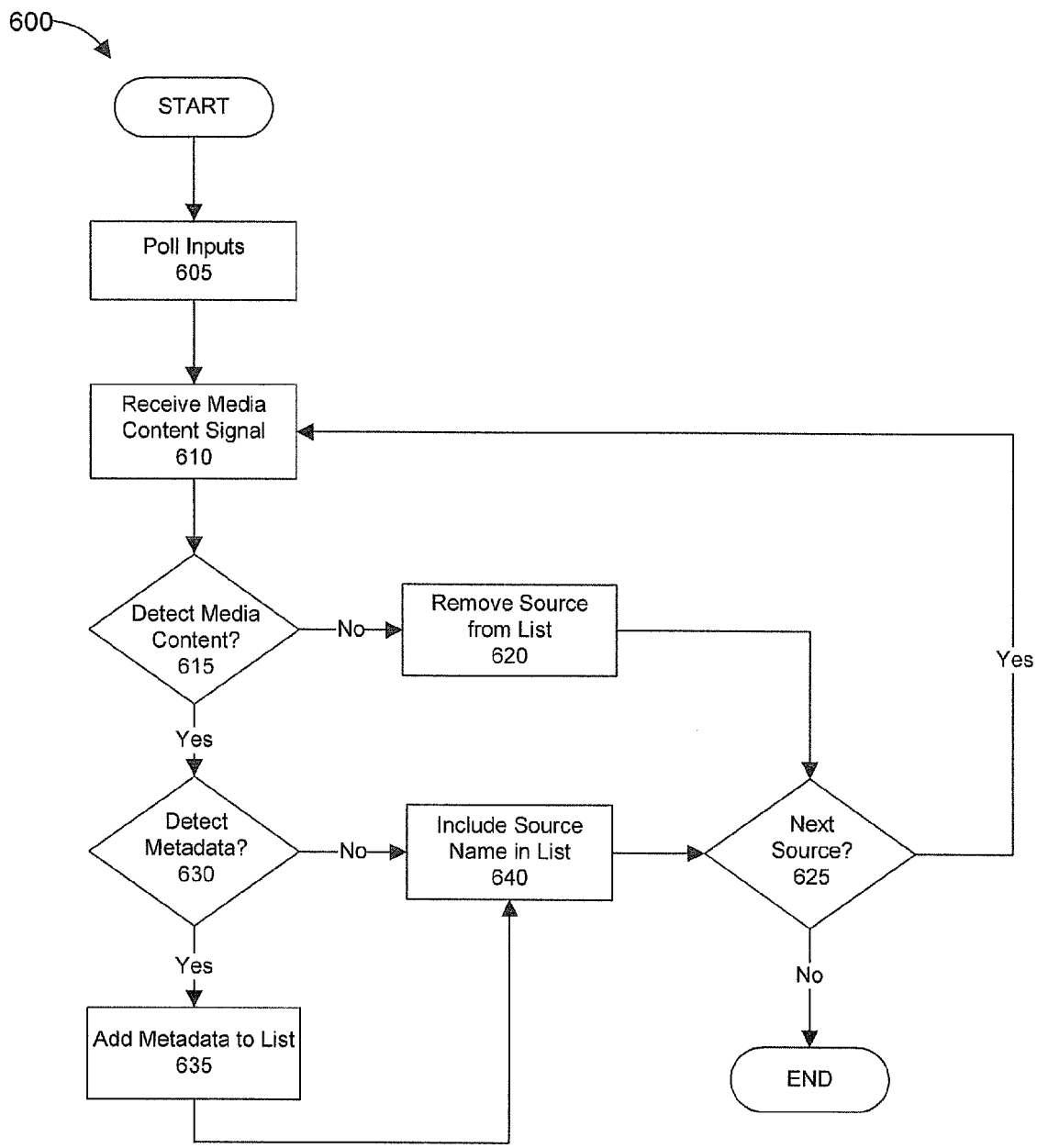
FIG. 6 illustrates an exemplary process for determining available sources.

FIG. 6 illustrates an exemplary process 600 for identifying media content sources 103 available to source aggregator 106. Generally, application 110 routinely polls inputs for sources 103, collecting information about available media content. Such information may then be used by application 10 to provide various menus to user 111, e.g., as illustrated above in FIGS. 2-5.

In step 605, application 110 polls the inputs of source aggregator 106 for active sources 103. For example, application 110 may query each input of source aggregator 106 to detect a media content signal, such as an active video or audio signal. For example, source aggregator 106 may include ten inputs, where each input may be connected to a source 103. In step 605, application 110 may poll each of the ten inputs to determine whether a source 103 is connected. After step 605, application 110 may determine that only five of the ten inputs are connected to media content sources 103, and therefore only those five inputs will be analyzed further as described below. Alternatively or additionally, source aggregator 106 may be configured to identify automatically certain inputs as inputs for active sources 103. Further alternatively or additionally, source aggregator 106 may be configured to identify an input as an input for an active source 103 upon detecting a signal, e.g., a video signal, through the input. For example, user 111 may power on a DVR connected to source aggregator 106, thereby providing a signal that is detected by source aggregator 103.

Next in step 610, source aggregator 106 receives a media content signal from one of the sources 103 identified in step 605. Application 110 may determine that source aggregator receives sources 103 identified in step 605 in a pre-determined order or at random.

Next in step 615, application 110 analyzes the received media content signal to determine whether media content is currently available for the particular source 103 associated with a particular input. Application 110 may then maintain a list of sources 103 that currently have available media content as described below with respect to step 640. Application 110 may use any number of known methods to determine whether a particular source 103 is currently delivering media content. For example, application 110 may determine whether a video or audio signal is present. If such a signal is present, application 110 may sample the signal to distinguish between media content and static, for example.

If application 110 determines that media content is unavailable from a particular source 103, such as when a DVD player is powered off, then step 620 is executed next. However, if application 110 determines that media content is available from a particular source 103, then step 630 is executed next.

In step 620, the source 103 from which media content was determined to be unavailable as described above with respect to step 615 is removed from the list of available sources 103.

Next in step 625, application 10 determines whether there are additional sources 103 that need to be analyzed. Generally, application 10 analyzes each source 103 that was identified in step 605. If there are no additional sources 103 to analyze, then process 600 ends. If there are additional sources 103 to analyze, then process 600 returns to step 610.

In step 630, application 10 may read from or query the source 103 for available metadata. As previously discussed, metadata may come from a variety of devices, including content processing device 102, IPG server 130, and web server 135. Generally, metadata includes information about media content, such as the title of a movie, the name of a program, the score of a sporting event, etc. For example, application 110 may read metadata from a stream of compressed video, e.g., an MPEG stream, as is known. Application 110 may also query IPG server 130 for metadata, obtain metadata from a signaling channel in signal 150, etc.

If application 110 is unable to obtain metadata about the media content, then step 640 is executed next. Otherwise, step 635 is executed next.

In step 635, application 110 adds the metadata to the list of available sources 103. The list may be used by application 110 to aid user 111 in managing the various media content sources 103. For example, the list may be provided to a GUI, thereby allowing user 111 to choose from a list of sources that currently have available media content. The list may be generic, only including the source device name or type, or the list may be specific by including metadata that describes the available media content. Generally, after executing step 635, step 640 is also executed, adding the source 103 associated with the metadata to the list. Application 10 then executes step 625 to determine if there are additional sources 103 to analyze. If there are no additional sources to analyze, then process 600 ends following step 625.

In step 640, the name of the source 103 determined to be providing available media content is included in a list of available sources 103 stored by application 110 for a user session.

Process 600 may be repeated periodically to maintain an accurate and up-to-date list of available sources 103. Generally, the list produced by process 600 may be used by application 110 to provide data for source select menu 310, sub-menu 420, additional sub-menus 420, headers 510, 520, and dynamic metadata 525, as illustrated in FIGS. 3-5.

Figure 7:
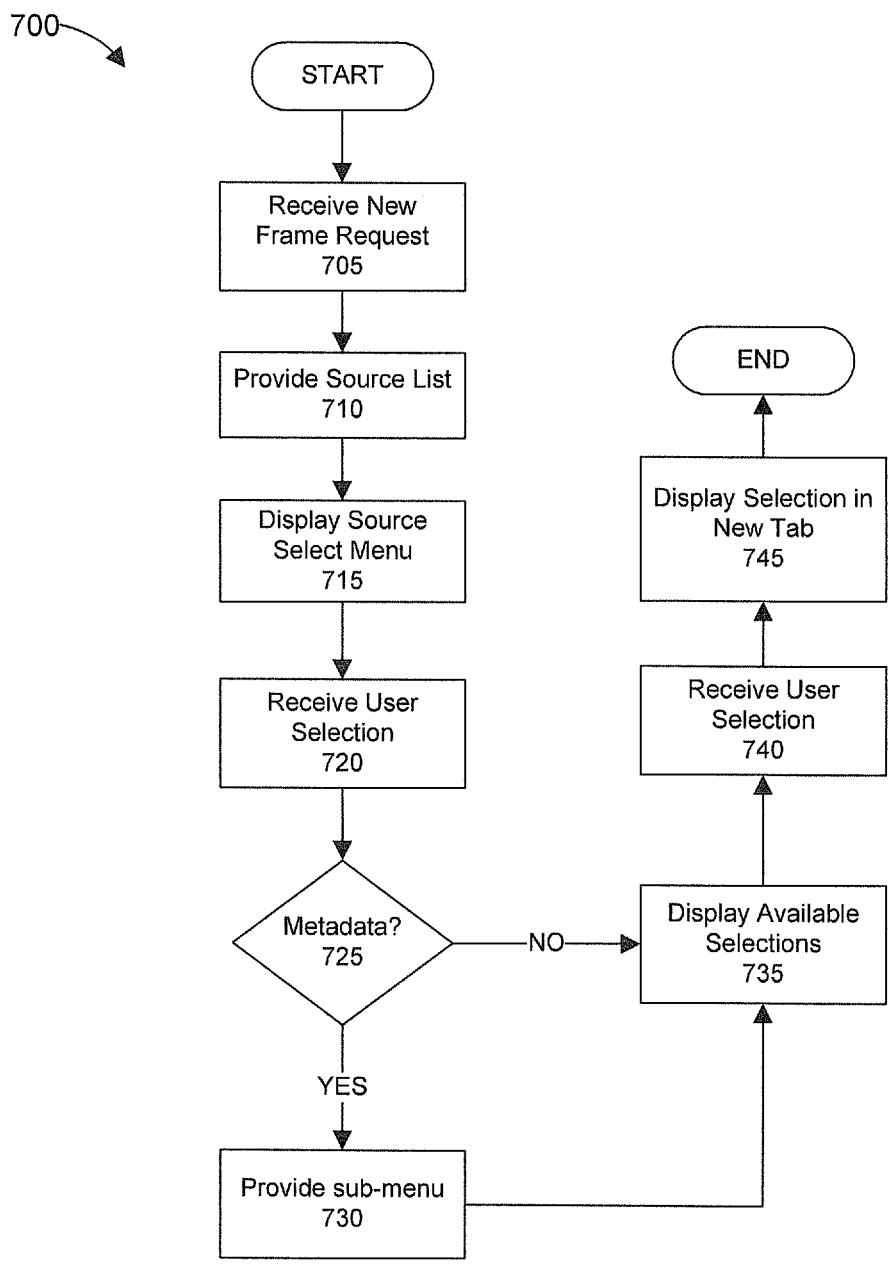
FIG. 7 illustrates an exemplary process for managing multiple media content sources.

FIG. 7 illustrates an exemplary process 700 for managing multiple media content sources 103. Application 110 may use process 700 to allow user 111 to access and manage multiple media content sources 103.

In step 705, application 110 receives a request for a new frame of media content from user 111, i.e., a request to access a new media content source 103, generally through control 112. User 111 may press a specialized button on control 112, or may simply access a general menu to submit a request for a new frame of media content. One such example is illustrated in FIG. 2, showing a new frame selector 210 that may be displayed after receiving a new frame request from user 111.

Next, in step 710, application 110 may assemble a list of available sources 103, or may access such a list stored in a memory of source aggregator 106, e.g., as a result of executing process 600 described above. Further, application 10 may access a static list of pre-determined sources 103. Further, user input may provide some or all of the contents of such list of sources 103. For example, user 111 may provide as input a name or label for each source 103, and/or user 111 may provide as input a location of a source 103, e.g., "DVR jack." In any event, in this step, application 10 accesses a list of available sources 103. Such a list of media content sources 103 may be used to provide a source select menu, as illustrated in FIG. 3, for example.

Next, in step 715, application 110 provides a source select menu 310 to user 111. Generally, as discussed above, a source select menu 310 provides user 111 with a list of available sources 103 accessed as described with reference to step 710 above. Generally, user 111 uses control 112 to navigate the source select menu and make a selection. A source select menu 310 may also prompt user 111 for additional input, such as a number identifying a media channel, a uniform resource locator (URL) for a website, etc. Accordingly, user 111 may use control 112 to input a channel number or URL. FIG. 3 illustrates one example of a source select menu 310.

Next in step 720, application 110 receives a source 103 selection from user 111. Generally, user 11 uses control 112 to navigate the source select menu 310 and input a selection. FIG. 4 illustrates one example where the DVR source 103 is selected through source select menu 310.

Next, in step 725, after user 111 makes a source 103 selection in step 720, application 10 may query for available metadata. Available metadata may include metadata as discussed above, such as a description of available media content, the name of the source, the score of a sporting event, etc. For example, metadata may include a list of recorded television programs available through a DVR. As mentioned above, such metadata may be provided in a variety of ways, e.g., application 110 may query a device, such as IPG server 130, for metadata, or metadata may be included with media content received form a source 103, e.g., in an MPEG stream, reading data from media signal 150, for example. Such metadata may then be used to provide information in a header, as illustrated in FIG. 5, where headers 510, 520 both include metadata. If metadata is available, step 730 is executed next. Otherwise, step 735 is executed next.

In step 730, application 10 may provide a sub-menu 420 to display available media content options, additional programs, etc. Note that a sub-menu 420 may include additional sub-menus 420. For example, as stated above, a second sub-menu 420 may include various episodes of a particular program recorded on different occasions. Further, a sub-menu 420 may request input from user 111, for example, by requesting a media channel number, a URL, a list of previously visited or favorite websites, etc. FIG. 4 illustrates one example of a sub-menu 420. In FIG. 4, sub-menu 420 is provided after selecting the DVR source 103. Sub-menu 420, as shown in FIG. 4, displays a list of available media content sources 103 available from the DVR.

Next, in step 735, application 10 may display the available source 103 or media content. For example, a VHS player may not provide additional metadata, so a sub-menu may only include the name of the device, e.g., "VHS player". Alternatively, when no metadata is available from a particular source, no sub-menu 420 may be available.

Next, in step 740, user 111 may use control 112 to select a desired source 103. For example, user 111 may select one episode of a previously recorded television show from a DVR. Generally, user 111 may use a GUI, as illustrated in FIG. 4, to select a desired media content source 103.

Next, in step 745, media content from the particular source 103 selected in step 740 is displayed in a new frame. FIG. 5 illustrates one example where media content 200 is displayed in a new frame. In FIG. 5, media content 200 is displayed from a media channel, e.g. channel 07, while media content from another source is available for quick access, as illustrated by header 510.

Following step 745, process 700 ends.

Source aggregator 106 may also provide various enhancements for each viewing frame. In one embodiment, source aggregator 106 may provide user 111 with digital recording and playback corresponding to each viewing frame. For example, source aggregator 106 may include digital recording capabilities by incorporating a digital video recorder (DVR), for example. In such an embodiment, source aggregator 106 may provide digital recording functionality for any available source 103, and provide such functionality for each viewing frame. For example, some DVRs provide automatic buffer recording, automatically recording media content and thereby allowing a user to rewind a program at any time. Source aggregator 106 may provide such buffer recording for media content in each viewing frame, thereby providing user 111 with digital video recording functionality simultaneously for multiple media content sources 103.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," c"said," etc. should be read to recite one or more of the indicated elements unless a claim recites an explicit limitation to the contrary.

I claim:

1. A system, comprising:
a source aggregator computing device that includes a processor and a memory and that selectively receives a plurality of instances of media content from a plurality of media content sources and selectively provides output to a media player based on at least some of the instances of media content; and
a software application included within the source aggregator computing device and that:
creates a first viewing frame,
associates the first viewing frame with a first media content source included in the plurality of media content sources,
provides the first viewing frame to the media player for display by the media player when the first viewing frame is active,
provides a first instance of media content included in the plurality of instances of media content and received from the first media content source included in the plurality of media content sources for display by the media player in the first viewing frame when the first viewing frame is active,
receives, while the first instance of media content is displayed by the media player in the active first viewing frame, a request for a creation of a second viewing frame,
creates, in response to the request, the second viewing frame,
provides, in response to the request, a frame header to the media player for display on a portion of the display of the first instance of media content in the first viewing frame by the media player when the first viewing frame is active, the frame header representing the second viewing frame,
provides a list of available media content sources included in the plurality of media content sources for display by the media player in a source select menu included in the new frame header,
receives a user selection of a second media content source included in the plurality of media content sources from the list of available media content sources displayed in the source select menu,
associates the second viewing frame with the second media content source included in the plurality of media content sources,
switches from the first viewing frame being active to the second viewing frame being active,
provides the second viewing frame to the media player for display by the media player when the second viewing frame is active, the display of the second viewing frame by the media player replacing the display of the first viewing frame by the media player,
provides a second instance of media content included in the plurality of instances of media content and received from the second media content source included in the plurality of media content sources for display by the media player in the second viewing frame when the second viewing frame is active, and
provides the frame header representing the second viewing frame and an additional frame header representing the first viewing frame for display on a portion of the display of the second media content instance in the second viewing frame by the media player when the second viewing frame is active, the additional frame header indicating that the first instance of media content is available for access by switching from the second viewing frame being active to the first viewing frame being active.

2. The system of claim 1, wherein the list of available media content sources indicates at least two of: a content processing device, a digital video disc (DVD) player, a digital video recorder (DVR), a computer, a gaming console, a digital camera, a memory card reader, a compact disc (CD) player, a media channel, a movie, a radio station, a video on demand program, a web page, a web server, and at least one media channel.

3. The system of claim 1, wherein the additional frame header includes metadata descriptive of the first instance of media content.

4. The system of claim 1, wherein the frame header includes dynamic metadata associated with the second instance of media content.

5. The system of claim 4, wherein:
the second instance of media content represents a sporting event; and
the dynamic metadata associated with the second instance of media content indicates a score of the sporting event.

6. The system of claim 1, wherein the frame header and the additional frame header are positioned adjacent to one another in a row and overlaid along an edge of the display of the second viewing frame.

7. The system of claim 1, wherein the software application further
receives user input selecting the additional frame header while the second instance of media content is displayed by the media player in the second viewing frame, and
switches, in response to the user input, from the second viewing frame being active to the first viewing frame being active such that the display of the second instance of media content in the second viewing frame is replaced with a display of the first instance of media content in the first viewing frame by the media player.

8. The system of claim 7, wherein:
the first instance of media content in the first viewing frame is not displayed by the media player when the second viewing frame is active; and
the second instance of media content in the second viewing frame is not displayed by the media player when the first viewing frame is active.

9. The system of claim 1, wherein the frame header is persistent.

10. The system of claim 1, wherein the frame header is temporary.

11. A method comprising:
receiving, by a computing device, media content from a plurality of media content sources;
creating, by the computing device, a first viewing frame;
associating, by the computing device, the first viewing frame with a first media content source included in the plurality of media content sources;
providing, by the computing device, the first viewing frame to a media player for display by the media player when the first viewing frame is active;
providing, by the computing device, a first instance of media content included in the media content and received from the first media content source included in the plurality of media content sources for display by the media player in the first viewing frame when the first viewing frame is active;
receiving, by the computing device while the first instance of media content is displayed by the media player in the active first viewing frame, a request for a creation of a second viewing frame;
creating, by the computing device in response to the request, the second viewing frame;
providing, by the computing device in response to the request, a frame header to the media player for display on a portion of the display of the first instance of media content in the first viewing frame by the media player when the first viewing frame is active, the frame header representing the second viewing frame;
providing, by the computing device, a list of available media content sources included in the plurality of media content sources for display by the media player in a source select menu included in the frame header;
receiving, by the computing device, a user selection of a second media content source included in the plurality of media content sources from the list of available media content sources displayed in the source select menu;
associating, by the computing device, the second viewing frame with the second media content source included in the plurality of media content sources;
switching, by the computing device, from the first viewing frame being active to the second viewing frame being active;
providing, by the computing device, the second viewing frame to the media player for display by the media player when the second viewing frame is active, the display of the second viewing frame by the media player replacing the display of the first viewing frame by the media player;
providing, by the computing device, a second instance of media content included in the media content and received from the second media content source included in the plurality of media content sources for display by the media player in the second viewing frame when the second viewing frame is active; and
providing, by the computing device, the frame header representing the second viewing frame and an additional frame header representing the first viewing frame for display on a portion of the display of the second media content instance in the second viewing frame by the media player when the second viewing frame is active, the additional frame header indicating that the first instance of media content is available for access by switching from the second viewing frame being active to the first viewing frame being active.

12. The method of claim 11, wherein the list of available media content sources indicates at least two of: a content processing device, a digital video disc (DVD) player, a digital video recorder (DVR), a computer, a gaming console, a digital camera, a memory card reader, a compact disc (CD) player, a media channel, a movie, a radio station, a video on demand program, a web page, a web server, and at least one media channel.

13. The method of claim 11, wherein the frame header includes information received from the second media content source about the second instance of media content and the additional frame header includes information received from the first media content source about the first instance of media content.

14. The method of claim 11, tangibly embodied as computer-executable instructions on a non-transitory computer-readable medium.

15. The method of claim 11, wherein the frame header includes dynamic metadata associated with the second instance of media content.

16. The method of claim 11, wherein the frame header and the additional frame header are positioned adjacent to one another in a row and overlaid along a top edge of the second viewing frame.

17. The method of claim 11, further comprising:
determining, by the computing device in response to the user selection of the second media content source from the list of available media content sources, that metadata associated with the second media content source is available; and
providing, by the computing device in response to the determination that metadata associated with the second media content source is available, a sub-menu to the media player for display by the media player, the sub-menu including a display of available media content options associated with the second media content source.

18. The method of claim 11, wherein the source select menu included in the frame header includes a channel number input field.

19. The method of claim 11, wherein the source select menu included in the frame header includes a uniform resource locator input field.

20. The method of claim 11, wherein:
the frame header displayed in the second viewing frame includes a cancel button selectable to delete the second viewing frame; and
the additional frame header displayed in the second viewing frame includes a cancel button selectable to delete the first viewing frame.

21. A method comprising:
polling, by a computing device, a plurality of inputs;
detecting, by the computing device, a plurality of media content sources connected to the plurality of inputs;

receiving, by the computing device, media content from the plurality of media content sources;

defining, by the computing device based on the detecting of the plurality of media content sources connected to the plurality of inputs and the receiving of the media content from the plurality of media content sources, a list of available media content sources;

receiving, by the computing device, a user request for a creation of a first viewing frame;

creating, by the computing device, the first viewing frame in response to the user request for the creation of the first viewing frame;

providing, by the computing device, the list of available media content sources for display by a media player in a source select menu;

receiving, by the computing device, a user selection of a first media content source from the list of available media content sources displayed in the source select menu;

associating, by the computing device in response to the user selection, the first viewing frame with the first media content source;

providing, by the computing device, the first viewing frame to the media player for display by the media player when the first viewing frame is active;

providing, by the computing device, a first instance of media content included in the media content and received from the selected first media content source for display by the media player in the first viewing frame when the first viewing frame is active;

receiving, by the computing device while the first instance of media content is displayed by the media player in the active first viewing frame, a user request for a creation of a second viewing frame;

creating, by the computing device, the second viewing frame in response to the user request for the creation of the second viewing frame;

providing, by the computing device in response to the user request for the creation of the second viewing frame, a frame header for display on a portion of the display of the first instance of media content in the first viewing frame by the media player when the first viewing frame is active, the frame header representing the second viewing frame;

providing, by the computing device, the list of available media content sources for display by the media player in the source select menu in the frame header;

receiving, by the computing device, a user selection of a second media content source from the list of available media content sources displayed in the source select menu;

associating, by the computing device, the second viewing frame with the second media content source;

switching, by the computing device, from the first viewing frame being active to the second viewing frame being active;

providing, by the computing device, the second viewing frame to the media player for display by the media player when the second viewing frame is active, the display of the second viewing frame by the media player replacing the display of the first viewing frame by the media player;

providing, by the computing device, a second instance of media content included in the media content and received from the selected second media content source for display by the media player in the second viewing frame when the second viewing frame is active;

providing, by the computing device, the frame header representing the second viewing frame and an additional frame header representing the first viewing frame for display on a portion of the display of the second media content instance in the second viewing frame by the media player when the second viewing frame is active, the additional frame header indicating that the first instance of media content is available for access by switching from the second viewing frame being active to the first viewing frame being active.

22. The method of claim 21, tangibly embodied as computer-executable instructions on a non-transitory computer-readable medium.

23. The method of claim 21, wherein the first media content source is associated with a first media device and the second media content source is associated with a second media device.

* * * * *